March 7, 1961  C. S. ARSLANIAN  2,973,551
NOZZLE

Filed Dec. 17, 1958  2 Sheets-Sheet 1

INVENTOR.
CHARLES SAMUEL ARSLANIAN
BY Leland R. McCann
George W. Reiber
ATTORNEYS March 7, 1961  C. S. ARSLANIAN  2,973,551
NOZZLE Filed Dec. 17, 1958  2 Sheets-Sheet 2

INVENTOR.
CHARLES SAMUEL ARSLANIAN
BY Leland R. McCann
George W. Reiber
ATTORNEYS United States Patent Office 2,973,551
Patented Mar. 7, 1961

2,973,551

NOZZLE

Charles Samuel Arslanian, Concord, Mass., assignor to American Can Company, New York, N.Y., a corporation of New Jersey Filed Dec. 17, 1958, Ser. No. 781,051

6 Claims. (Cl. 18—12)

The present invention relates to a nozzle of the type made of two pieces bolted together for the extrusion of a ribbon-like stream of thermoplastic cements or adhesives and has particular reference to a seamless inner liner for such a nozzle.

In the manufacture of nozzles for extruding ribbon-like streams of semi-fluid materials for application to articles such as container body blanks and the like, it has been found that machining or shaping of the nozzle cavity in both halves of the nozzle must be effected to a high degree of accuracy which results in extremely high costs. Even when extreme care is taken to provide perfectly true surfaces, leakage occurs between the parts and this results in a build-up or feathering effect at the ends of the nozzle opening and causes irregular edges on the extruded ribbon of material. In such nozzles, gaskets cannot be used for various reasons.

It is an object of the instant invention to provide a seamless liner for such a split nozzle, so that leakage between the parts is prevented, thereby avoiding feathering of the extruded material at the ends of the nozzle, with the result that a clean cut ribbon of extruded material is obtained.

Another object is to provide for the elimination of extreme accuracy in the machining of the nozzle cavity in the nozzle parts with the result that reduced costs of producing the nozzle may be effected.

Another object is the provision of such a seamless liner which may be readily shaped to produce the extrusion of a ribbon-like stream of material.

Numerous other objects and advantages of the invention will be apparent as it is better understood from the following description, which taken in connection with the accompanying drawings, discloses a preferred embodiment thereof.

Referring to the drawings.

Figure 1:
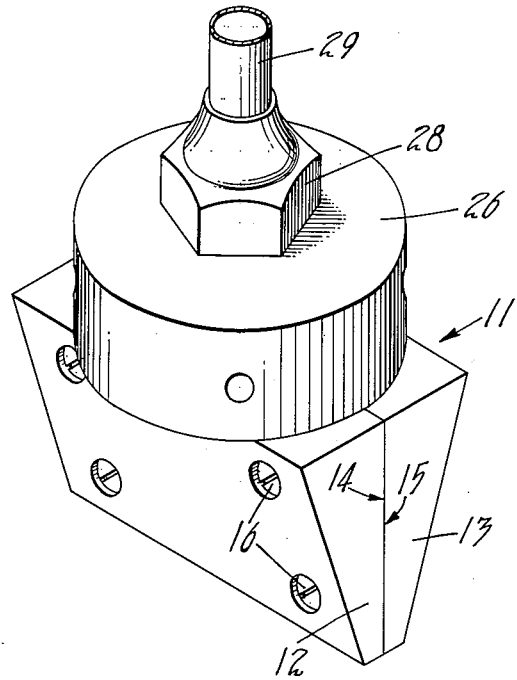
Figure 1 is a perspective view of a split extruding nozzle embodying the instant invention.

As a preferred and exemplary embodiment of the instant invention the drawings disclose a two piece or split nozzle 11 (Figs. 1 and 2) for extruding under pressure a semi-fluid thermoplastic material such as a cement or an adhesive in a thin, flat, ribbon-like stream for immediate application to container parts, such as along the side seam edges of can or container body blanks or the like.

Figure 2:
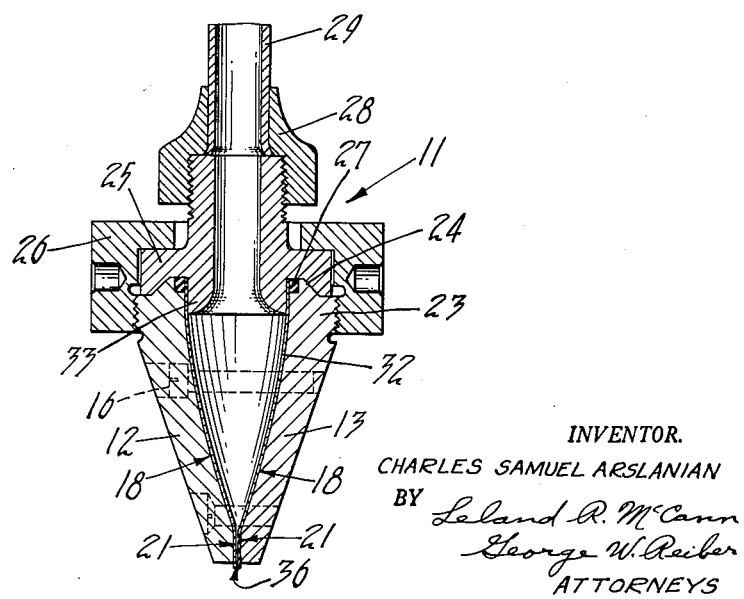
Fig. 2 is a sectional view of the nozzle shown in Fig. 1.
Figure 3:
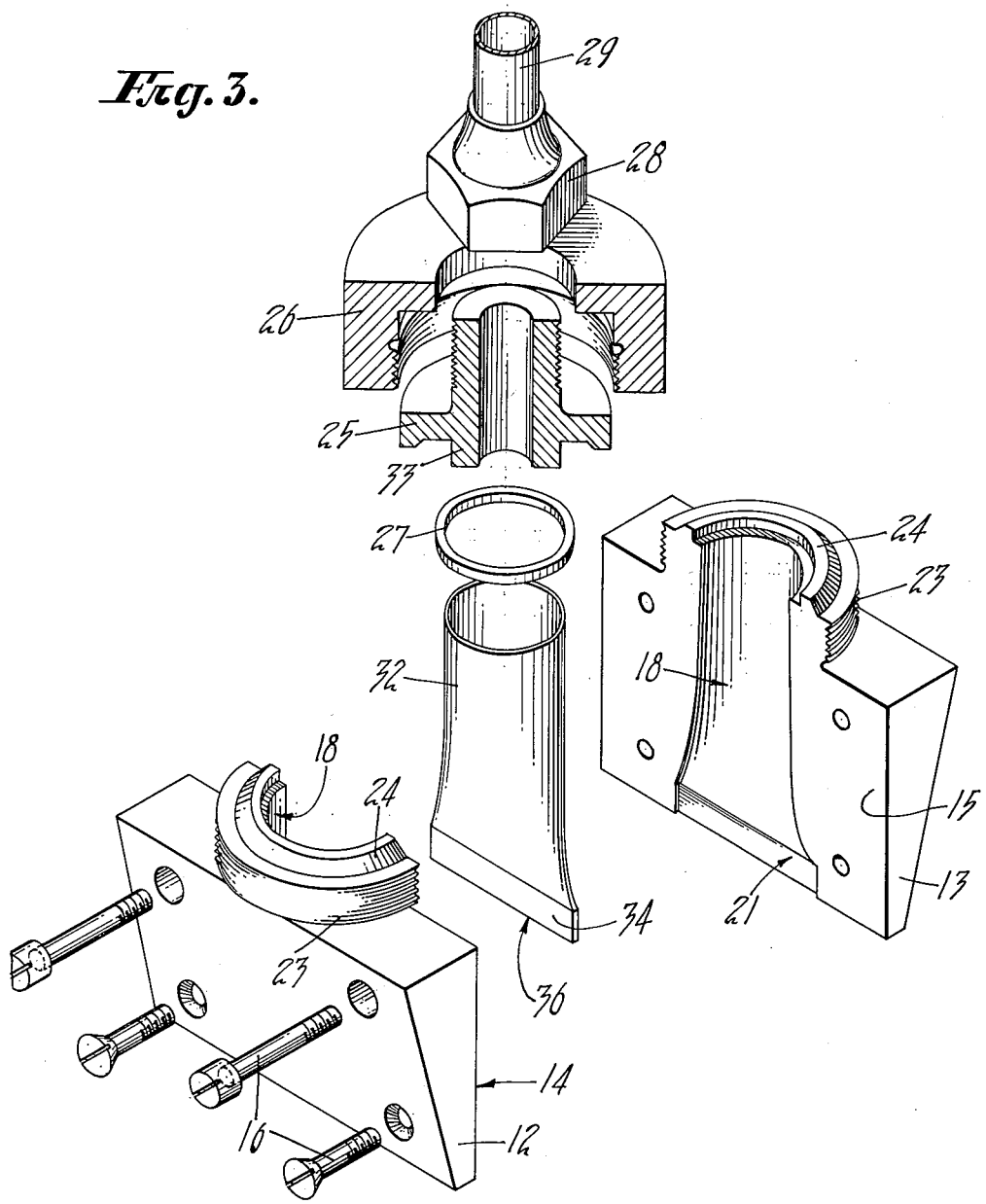
Fig. 3 is an exploded view of the nozzle shown in Fig. 1, the view illustrating the various parts of the nozzle prior to assembling into a complete nozzle structure.

The nozzle 11 preferably comprises a pair of oppositely disposed nozzle blocks 12, 13 of substantially rectangular configuration, having contiguous flat faces 14, 15 which are bolted tightly together by a plurality of bolts or screws 16. Each block 12, 13 is formed with an open internal cavity 18 (see Fig. 3) of a configuration which matches each other so that when the two blocks 12, 13 are bolted together the two cavities 18 form one symmetrical enclosed cavity which constitutes the main cavity of the nozzle as shown in Fig. 2. This cavity 18 preferably is cylindrical at its upper end and flares outwardly and downwardly into a narrow elongated recess 21 extending along the bottom edges of the block faces 14, 15.

Adjacent and surrounding the upper cylindrical end of the main cavity 18, the two blocks 12, 13 are provided with an upright, threaded, split neck portion 23, having a tapered cylindrical sealing seat 24 for a pipe coupling 25 which is clamped tightly in position on the nozzle neck portion 23 by a clamping ring 26. The ring 26 axially surrounds the coupling 25 and is threadedly engaged with the threads on the nozzle neck portion 23. A gasket 27 may be provided in the sealing seat 24 if desired.

The coupling 25 extends upwardly beyond the clamping ring 26 and is secured tightly by a nut 28 to one end of a pipe or tube 29 which leads from any suitable supply of the thermoplastic material under pressure to be extruded from the nozzle. The nut 28 surrounds the pipe 29 and is threadedly engaged with the upper end of the coupling 25.

In order to provide against leakage of the thermoplastic material through the clamped together faces 14, 15 of the nozzle blocks 12, 13 the nozzle 11 is provided with a seamless liner 32 which is disposed in the nozzle cavity 18. This liner 32 preferably is made of metallic tubular material and at its upper end is cylindrical in form to fit the cylindrical portion of the cavity 18.

When the liner 32 is in place in the nozzle cavity 18, the upper cylindrical end of the liner surrounds a depending cylindrical skirt portion 33 (see Fig. 2) of the coupling 25. This coupling skirt portion 33 extends down into the upper cylindrical end of the nozzle cavity 18 and is of a diameter sufficient to tightly clamp the upper end of the liner 32 laterally against the cavity surface of the upper end of the blocks 12, 13 so as to prevent leakage of the thermoplastic material past this joint. The gasket 27 may be used to facilitate effecting a seal at this joint.

The lower portion of the liner 32 is flattened and shaped to substantially conform to the lower portion of the nozzle cavity 18. At its lower terminal end, the liner 32 is formed as a narrow elongated flat member 34 which seats in the recesses 21 in the nozzle block faces 14, 15. This terminal end of the liner 32 is provided with a narrow slit or elongated orifice 36 (Fig. 2) which communicates with the interior of the nozzle and which constitutes the nozzle orifice and which determines the width and thickness of the ribbon of thermoplastic material extruded from the nozzle. This orifice portion, or lower terminal end of the liner, preferably extends below the terminal edges of the nozzle blocks 12, 13 as shown in Fig. 2 so as to be clear of the nozzle blocks and thereby insure against feathering of the extruded material at the ends of the orifice slit.

With such a construction of two piece nozzle, the seamless liner 32 provides a continuous, leakproof surface in the cavity 18, which is economical to produce and install in the nozzle and which may be readily replaced when necessary.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:
1. A two piece nozzle for extruding ribbon-like streams of semi-fluid materials, comprising a pair of oppositely disposed nozzle blocks secured together to produce a unitary structure, each of said blocks having an open internal cavity which cooperate with each other to set off in said secured together blocks a main enclosed cavity, and a seamless tube liner disposed in said main cavity and having at its inner end an inlet opening disposed in advance of its rear edge and having at its outer end a discharge opening disposed in advance of the forward secured edges of said nozzle blocks, said liner providing for the passage of a semi-fluid material therethrough to confine said material against leakage between said nozzle blocks.

2. A two piece nozzle of the character defined in claim 1 wherein said enclosed cavity is of cylindrical configuration at its inlet end and flares outwardly at its lower end into a flat elongated section and wherein said seamless liner is of substantially the same configuration to provide at its lower discharge end an elongated narrow orifice for extruding said materials in ribbon formation.

3. A two piece nozzle of the character defined in claim 1 wherein said liner at its discharge end is flat and defines an elongated narrow slit discharge orifice for extruding said material in ribbon-like formation and wherein said nozzle blocks adjacent said discharge end of said liner are recessed to accommodate said liner end to provide for the confinement of said liner end without distortion thereof when said blocks are secured together tightly.

4. A two piece nozzle of the character defined in claim 1 wherein each of said nozzle blocks is provided with a neck portion which when said blocks are secured together provides a cylindrical neck surrounding a cylindrical portion at the inlet end of said main cavity, and wherein there is provided a coupling seated on said neck portion, and a clamping ring secured to said neck portion and surrounding said coupling for holding said coupling tightly in place, and a cylindrical skirt portion depending from said coupling and projecting into a cylindrical inlet end of said seamless liner and tightly clamping said liner end against said blocks at said cylindrical portion of said main cavity.

5. A two piece nozzle of the character defined in claim 4 wherein said coupling is secured to an inlet pipe for feeding said semi-fluid material under pressure into said seamless liner.

6. A two piece nozzle of the character defined in claim 1 wherein said seamless liner provides a continuous seamless passageway through all of the split parts of said nozzle.

References Cited in the file of this patent
UNITED STATES PATENTS

| | | |
|---|---|---|
| 2,514,211 | Carlson | July 4, 1950 |
| 2,715,256 | Siegrist | Aug. 16, 1955 |
| 2,783,498 | Richardson | Mar. 5, 1957 |